(12) United States Patent
Goli (10) Patent No.: US 12,432,143 B2
(45) Date of Patent: Sep. 30, 2025

(54) SYSTEM AND METHODS FOR SELECTIVELY ROUTING PACKETS AND DEVICES THEREOF

(71) Applicant: F5, Inc., Seattle, WA (US)

(72) Inventor: Nihar Goli, Karimanagar (IN)

(73) Assignee: F5, Inc., Seattle, WA (US)

( * ) Notice: Subject to any disclaimer, the term of this patent is extended or adjusted under 35 U.S.C. 154(b) by 0 days.

(21) Appl. No.: 18/372,844

(22) Filed: Sep. 26, 2023

(65) Prior Publication Data

US 2025/0106154 A1    Mar. 27, 2025

(51) Int. Cl.
| | | |
|---|---|---|
| G06F 13/00 | (2006.01) | |
| H04L 45/42 | (2022.01) | |
| H04L 45/745 | (2022.01) | |
| H04L 61/4511 | (2022.01) | |
| H04L 61/5076 | (2022.01) | |

(52) U.S. Cl.
CPC ............ *H04L 45/745* (2013.01); *H04L 45/42* (2013.01); *H04L 61/4511* (2022.05); *H04L 61/5076* (2022.05)

(58) Field of Classification Search
CPC ... H04L 45/745; H04L 45/42; H04L 61/4511; H04L 61/5076
USPC .......................... 709/245, 223, 238, 203, 220
See application file for complete search history.

(56) References Cited

U.S. PATENT DOCUMENTS

| | | |
|---|---|---|
| 8,428,610 B2 | 4/2013 | Chowdhury et al. |
| 9,465,548 B1 | 10/2016 | Hrischuk et al. |
| 9,621,577 B2 | 4/2017 | Akcin |
| 9,628,509 B2 | 4/2017 | Holloway et al. |
| 9,674,064 B1 | 6/2017 | Thorson |
| 9,749,355 B1 | 8/2017 | Benson et al. |
| 10,200,402 B2 | 2/2019 | Radlein et al. |
| 10,810,528 B1 | 10/2020 | Phillips et al. |
| 11,178,163 B2 | 11/2021 | Correa Bahnsen |
| 11,302,215 B2 | 4/2022 | Donovan et al. |
| 11,416,432 B2 | 8/2022 | Coddington |
| 2005/0183084 A1 | 8/2005 | Cuomo et al. |

(Continued)

FOREIGN PATENT DOCUMENTS

| | | |
|---|---|---|
| WO | 2006004556 A1 | 1/2006 |
| WO | 2016164403 A1 | 10/2016 |

OTHER PUBLICATIONS

International Search Report issued in corresponding PCT/US2020/057241; mailed Feb. 5, 2021; 3 pages.

(Continued)

*Primary Examiner* — Kenneth R Coulter
(74) *Attorney, Agent, or Firm* — Troutman Pepper Locke LLP (57) ABSTRACT

Methods, non-transitory computer readable media, network traffic manager apparatuses, and systems that assist with selectively routing packets includes receiving a domain name system request from a client. The domain name system request can comprise a configuration for registration of an adapter and then, based on the configuration of the domain name system request, a server can be determined to send the domain name system request. The configuration can comprise an adapter type and the server is determined at least in part based on the adapter type of the configuration. Then the domain name system request can be transmitted to the determined server.

20 Claims, 5 Drawing Sheets

(56) References Cited

U.S. PATENT DOCUMENTS

| | | |
|---|---|---|
| 2007/0280114 A1 | 12/2007 | Chao et al. |
| 2011/0317566 A1 | 12/2011 | Keen |
| 2012/0147891 A1 | 6/2012 | Heo |
| 2013/0080517 A1 | 3/2013 | T'Syen |
| 2013/0305044 A1 | 11/2013 | Gutt |
| 2015/0358402 A1 | 12/2015 | Stolyar |
| 2016/0080398 A1 | 3/2016 | Yablokov |
| 2016/0094433 A1 | 3/2016 | Friedel |
| 2016/0301624 A1 | 10/2016 | Gonzalez et al. |
| 2017/0195354 A1 | 7/2017 | Kesin |
| 2017/0302577 A1 | 10/2017 | Worth |
| 2017/0359261 A1 | 12/2017 | Avci et al. |
| 2018/0167362 A1 | 6/2018 | Glenn et al. |
| 2018/0176248 A1 | 6/2018 | Nikravesh |
| 2019/0158533 A1 | 5/2019 | Holloway et al. |
| 2019/0356729 A1 | 11/2019 | Bivens et al. |
| 2020/0226144 A1 | 7/2020 | Chen et al. |
| 2020/0304477 A1 | 9/2020 | Venkataraman |
| 2020/0311573 A1 | 10/2020 | Desai et al. |
| 2020/0389430 A1 | 12/2020 | Di Mattia |
| 2021/0126940 A1 | 4/2021 | O'Hara et al. |
| 2021/0174281 A1 | 6/2021 | Bhaskara et al. |
| 2024/0154932 A1* | 5/2024 | Jang .................. G06Q 20/16 |

OTHER PUBLICATIONS

International Preliminary Report on Patentability issued in corresponding PCT/US2020/057241; mailed May 17, 2022; 7 pages.

Chouhan, et al., "Packet Monitoring Approach to Prevent DDoS Attack in Cloud Computing", International Journal of Computer Science and Electrical Engineering, vol. 1, Issue 1, 2012; 5 pages.

Cormode, et al. "An Improved Data Stream Summary: The Count-Min Sketch and its Applications", J. Algorithms.55:(2005); 29-38.

Hase et al.; "An Efficient Way to Prevent Dos/Ddos Attack in the Cloud Environment"; Int. J. Sci. Res.; 5; 3; Mar. 2016; 4 pages.

IPv4 Address: Structure, Classes and Types study.com, Aug. 27, 2019 URL:https://www.study.com/academy/lesson/ipv4-address-structure-classes-and-types.html. 2 pages.

Kak, "Lecture 16: TCP/IP Vulnerabilities and DOS Attacks: IP Spoofing, SYN Flooding, and The Shrew DOS Attack", Lecture Notes on "Computer and Network Security", Mar. 7, 2019, Purdue University.

Kousiouris "Minimizing the Effect of DoS Attacks on Elastic Cloud-based Applications Based on Application-level Markov Chain Checkpoints", Proceedings of the 4th International Conference on Cloud Computing and Services Science (CLOSER-2014); 2014; 622-8.

Manfredi, et al., "Understanding Stateful vs Stateless Communication Strategies for Ad hoc Networks", MobiCom 11; Sep. 19-23, 2011; Las Vegas, NV; 12 pages.

Mao, "TCP Flow Control and Congestion Control", EELS 489 Computer Networks, http://www.eecs.umich.edu/courses/eec,s489/w07; Feb. 5, 2007; 55 pages.

Renjan et al., "DAbR: Dynamic Attribute-based Reputation scoring for Malicious IP Address Detection", 2018 IEEE; 6 pages.

ITL Expiry Attack Identification and Mitigation, Cisco, Aug. 27, 2019 URL:https://www.cisco.com/c/en/us/about/security-center/ttl-expiry-attack.html; 6 pages.

Wilkins, "The Anatomy of a Packet Path (ICMP) from Source to Destination", Pearson IT Certification, Aug. 27, 2019; URL:www.pearsonitcertification.com/articles.aspx?=1804873. 3 pages.

Wu et al. "SPMLD: Sub-packet based multipath load distribution for real-time multimedia traffic", Journal of Communication and Networks, vol. 16, Issue 5,, Oct. 2014.

Ward et al., "Efficient Hashing for Dynamic Per-Flow Network-Interface Selection", 2014 IEEE International Conference on Advanced Networking and Applications, May 13, 2014, IEEE Publishing (Year: 2014).

Anonymous: "Configuring the DNS adapter Documentation for TrueSight Orchestration Content 23.1—BMC Documentation". Mar. 24, 2023. URL: https://docs.bmc.com/docs/TruesightOrchestrationContent/231/configuring-the-dnsadapter-1192634757.html.

Anonymous: "Release notes and notices—Documentation for TrueSight Orchestration Content 23.1—BMC Documentation" URL: https://docs.bmc.com/docs/TruesightOrchestrationContent/231/release-notes-and-notices-1192634242.html.

Vixie P et al: "Dynamic Updates in the Domain Name System (DNS Update); Rfc2136.Txt" Dynamic Updates in the Domain Name System (DNS Update)?; RFC2136.TXT, Internet Engineering Task Force, IETF; Standard, Internet Society (ISOC) 4, Rue Des Falaises CH-1205 Geneva, Switzerland, Apr. 1, 1997 (Apr. 1, 1997), XP015007920.

European Search Report dated Feb. 6, 2025. European Patent Application No. 242019628.

International Preliminary Report on Patentability for PCT/US2023/032158, dated Jun. 10, 2025.

* cited by examiner

SYSTEM AND METHODS FOR SELECTIVELY ROUTING PACKETS AND DEVICES THEREOF

FIELD

This technology relates to methods and systems for selectively routing packets in a network by selectively registering an adapter.

BACKGROUND

Registering network adapters, regardless of the type of adapter, to all DNS servers can result in an increase in downtime and reduction of performance. Windows OS currently registers network adapters by sending a request to available DNS servers instead of to a select DNS server. As a result, adapter registration unfortunately cannot be granularly controlled.

SUMMARY

A method for selectively routing packets, implemented in cooperation with a network traffic management system comprising one or more network traffic management modules, server modules, or client modules, includes receiving a domain name system request from a client. The domain name system request can comprise a configuration for registration of an adapter and then, based on the configuration of the domain name system request, a server can be determined to send the domain name system request. The configuration can comprise an adapter type and the server is determined at least in part based on the adapter type of the configuration. Then the domain name system request can be transmitted to the determined server.

A network traffic management apparatus including memory including programmed instructions stored thereon and one or more processors configured to be capable of executing the stored programmed instructions to receive a domain name system request from a client. The domain name system request can comprise a configuration for registration of an adapter and then, based on the configuration of the domain name system request, a server can be determined to send the domain name system request. The configuration can comprise an adapter type and the server is determined at least in part based on the adapter type of the configuration. Then the domain name system request can be transmitted to the determined server.

A non-transitory computer readable medium having stored thereon instructions for including executable code that, when executed by one or more processors, causes the processors to receive a domain name system request from a client. The domain name system request can comprise a configuration for registration of an adapter and then, based on the configuration of the domain name system request, a server can be determined to send the domain name system request. The configuration can comprise an adapter type and the server is determined at least in part based on the adapter type of the configuration. Then the domain name system request can be transmitted to the determined server.

A network traffic management system includes one or more traffic management modules, server modules, or client modules, memory comprising programmed instructions stored thereon, and one or more processors configured to be capable of executing the stored programmed instructions to receive a domain name system request from a client. The domain name system request can comprise a configuration for registration of an adapter and then, based on the configuration of the domain name system request, a server can be determined to send the domain name system request. The configuration can comprise an adapter type and the server is determined at least in part based on the adapter type of the configuration. Then the domain name system request can be transmitted to the determined server.

This technology provides a number of advantages including providing methods, non-transitory computer readable media, network traffic management apparatuses, and network traffic management systems that help to provide granular control over which DNS servers an adapter is registered on. Additionally, this technology improves the distribution of web traffic across multiple DNS servers which improves website performance, reduces downtime, and increases privacy and security of the system.

DETAILED DESCRIPTION

An example of a network environment 10 with a network traffic manager apparatus 14 for selective routing of dynamic DNS packets is illustrated in FIGS. 1-5. The exemplary environment 10 includes a plurality of client computing devices 12(1)-12(n), a network traffic manager apparatus 14, and a plurality of servers 16(1)-16(n) which are coupled together by communication networks 30, although the environment can include other types and numbers of systems, devices, components, and/or elements and in other topologies and deployments. While not shown, the exemplary environment 10 may include additional network components, such as routers, switches, and other devices, which are well known to those of ordinary skill in the art and thus will not be described here.

Figure 1:
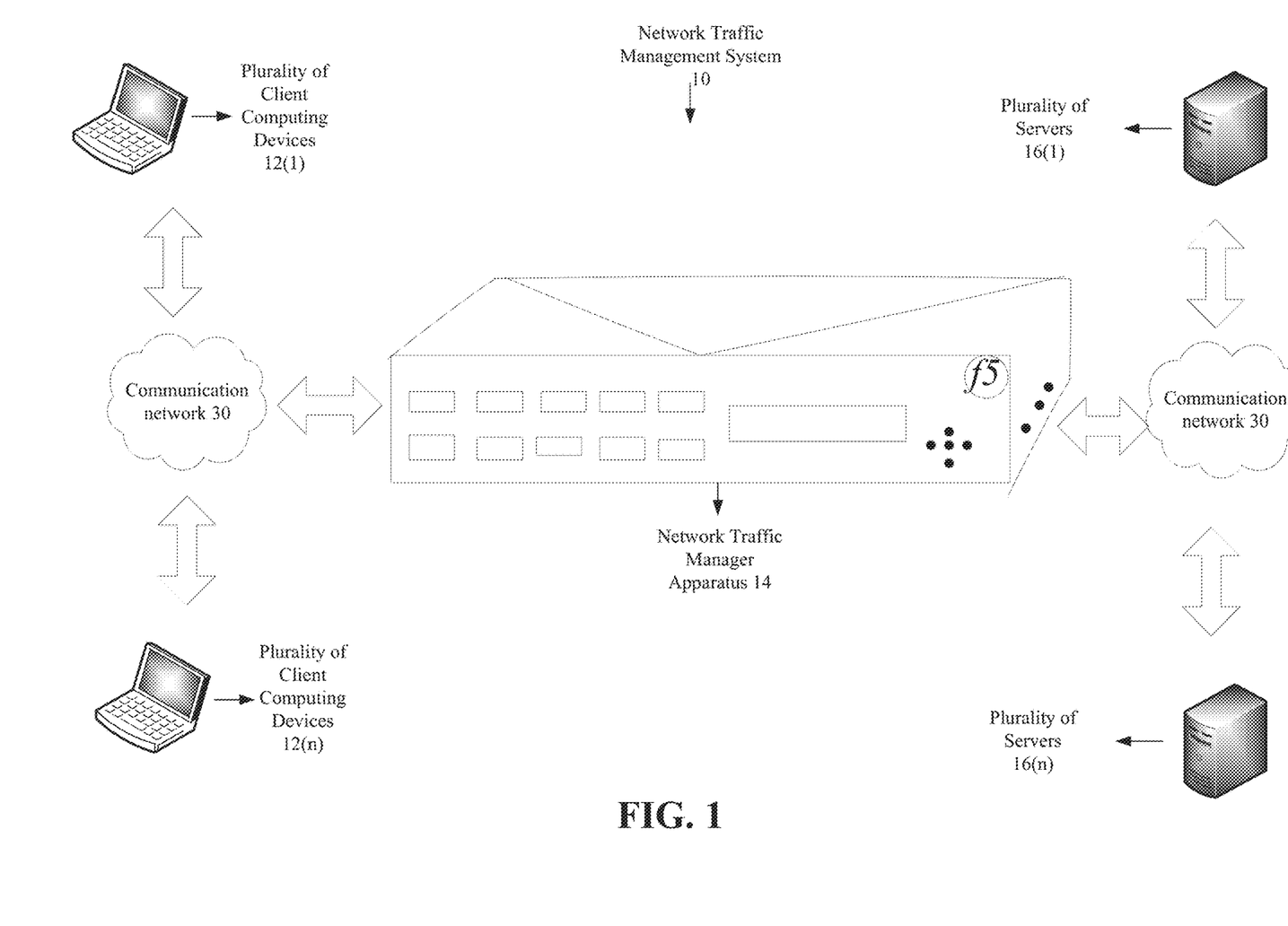
FIG. 1 is a block diagram of an exemplary network traffic management system with a network traffic management apparatus configured to for selectively route packets in a network by selectively registering an adapter.

Referring more specifically to FIG. 1, the network traffic manager apparatus 14 of the network traffic management system 10 is coupled to the plurality of client computing devices 12(1)-12(n) through the communication network 30, although the plurality of client computing devices 12(1)-12(n) and network traffic manager apparatus 14 may be coupled together via other topologies. Additionally, the network traffic manager apparatus 14 is coupled to the plurality of servers 16(1)-16(n) through the communication network 30, although the servers 16(1)-16(n) and the network traffic manager apparatus 14 may be coupled together via other topologies. In some examples, the network traffic manager apparatus 14 of the network traffic management system 10 is coupled to the plurality of client computing devices 12(1)-12(n) and a Domain Name System ("DNS") server 16(1) through the communication network 30, although the network traffic manager apparatus 14 may be coupled to the plurality of client computing devices 12(1)-12(n) and DNS server 16(1) together via other topologies.

The network traffic manager apparatus 14 assists with selectively routing packets as illustrated and described by way of the examples herein, although the network traffic manager apparatus 14 may perform other types and/or numbers of functions. The network traffic manager apparatus 14 includes processor or central processing unit (CPU), memory, and a communication system which are coupled together by a bus device although the network traffic manager apparatus 14 may comprise other types and numbers of elements in other configurations. In this example, the bus is a PCI Express bus in this example, although other bus types and links may be used.

The processors within the network traffic manager apparatus 14 may execute one or more computer-executable instructions stored in memory for the methods illustrated and described with reference to the examples herein, although the processor can execute other types and numbers of instructions and perform other types and numbers of operations. The processor may comprise one or more central processing units ("CPUs") or general purpose processors with one or more processing cores, such as AMD® processor(s), although other types of processor(s) could be used (e.g., Intel®).

Figure 2:
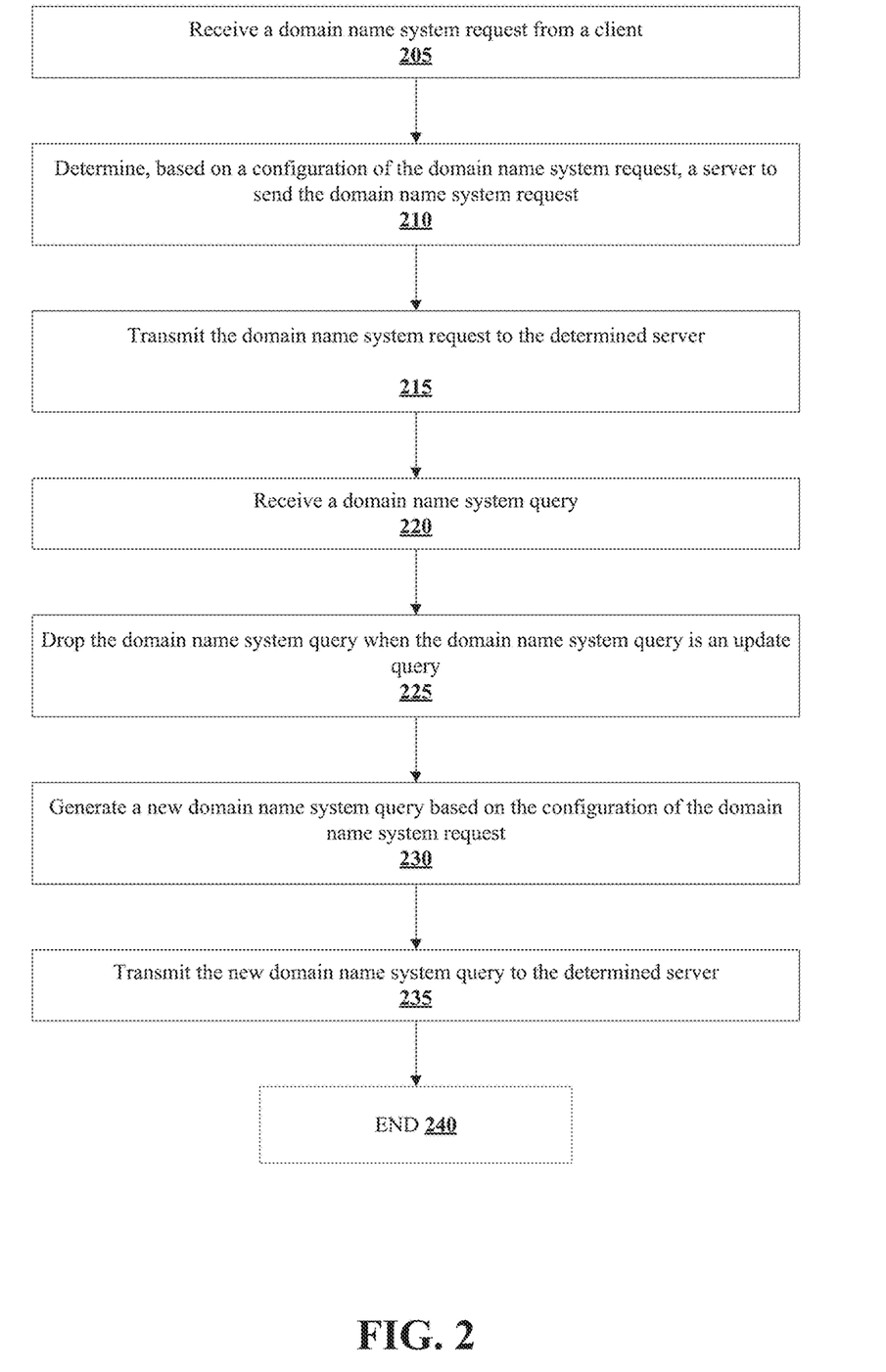
FIG. 2 is a flowchart of an exemplary method for selectively routing packets.

The memory within the network traffic manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory may store one or more non-transitory computer-readable instructions of this technology as illustrated and described with reference to the examples herein that may be executed by the processor. The exemplary flowchart shown in FIG. 2 is representative of example steps or actions of this technology that may be embodied or expressed as one or more non-transitory computer or machine readable instructions stored in the memory that may be executed by the processor and/or may be implemented by configured logic in the optional configurable logic.

Accordingly, the memory of the network traffic manager apparatus 14 can store one or more applications that can include computer executable instructions that, when executed by the network traffic manager apparatus 14, causes the network traffic manager apparatus 14 to perform actions, such as to transmit, receive, or otherwise process messages, for example, and to perform other actions described and illustrated below with reference to FIGS. 2-5. For example, the network traffic manager apparatus 14 can provide kernel services to make DNS queries by behaving like a DNS resolver. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the network traffic manager apparatus 14 itself, may be located in virtual server(s) running in a cloud-based computing environment rather than being tied to one or more specific physical network computing devices. Also, the application(s) may be running in one or more virtual machines (VMs) executing on the network traffic manager apparatus 14. Additionally, in at least one of the various embodiments, virtual machine(s) running on the network traffic manager apparatus 14 may be managed or supervised by a hypervisor.

The communication system 24 in the network traffic manager apparatus 14 is used to operatively couple and communicate between the network traffic manager apparatus 14, the plurality of client computing devices 12(1)-12(n), and the plurality of servers 16(1)-16(n) which are all coupled together by communication network 30 such as one or more local area networks (LAN) and/or the wide area network (WAN), although other types and numbers of communication networks or systems with other types and numbers of connections and configurations to other devices and elements may be used. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus is a PCI Express bus in this example, although other bus types and links may be used.

Each of the plurality of client computing devices 12(1)-12(n) of the network traffic management system 10, include a central processing unit (CPU) or processor, a memory, input/display device interface, configurable logic device and an input/output system or I/O system, which are coupled together by a bus or other link. The plurality of client computing devices 12(1)-12(n), in this example, may provide an interface to make requests for and send and/or receive data to and/or from the servers 16(1)-16(n) or the proxy 50 via the network traffic manager apparatus 14. Additionally, the plurality of client computing devices 12(1)-12(n) can include any type of computing device that can receive, render, and facilitate user interaction, such as client computers, network computer, mobile computers, mobile phones, virtual machines (including cloud-based computer), or the like. Each of the plurality of client computing devices 12(1)-12(n) utilizes the network traffic manager apparatus 14 to conduct one or more operations with the servers 16(1)-16(n), such as to obtain data and/or access the applications from one of the servers 16(1)-16(n), by way of example only, although other numbers and/or types of systems could be utilizing these resources and other types and numbers of functions utilizing other types of protocols could be performed.

Each of the plurality of servers 16(1)-16(n) of the network traffic management system include a central processing unit (CPU) or processor, a memory, and a communication system, which are coupled together by a bus or other link, although other numbers and/or types of network devices could be used. Generally, the plurality of servers 16(1)-16(n) process requests for providing access to one or more applications received from the plurality of client computing devices 12(1)-12(n), network traffic manager apparatus 14, via the communication network 30, but the principles discussed herein are not limited to this example and can include other protocols. A series of applications may run on the servers 16(1)-16(n) that allows the transmission of responses requested by the plurality of client computing devices 12(1)-12(n), or the network traffic manager apparatus 14. The plurality of servers 16(1)-16(n) may provide data or receive data in response to requests directed toward the respective applications on the plurality servers 16(1)-16(n) from the plurality of client computing devices 12(1)-12(n) or the network traffic manager apparatus 14. It is to be understood that the plurality of servers 16(1)-16(n) may be hardware or software or may represent a system with multiple external resource servers, which may include internal or external networks. It is to be also understood that the plurality of servers 16(1)-16(n) may be DNS servers that translates domain names into IP addresses to enable the plurality of client computing devices 12(1)-12(n) to reach the origin server.

Although the plurality of servers 16(1)-16(n) are illustrated as single servers, each of the plurality of servers 16(1)-16(n) may be distributed across one or more distinct network computing devices. Moreover, the plurality of servers 16(1)-16(n) are not limited to a particular configuration. Thus, the plurality of servers 16(1)-16(n) may contain a plurality of network computing devices that operate using a master/slave approach, whereby one of the network computing devices of the plurality of servers 16(1)-16(n) operate to manage and/or otherwise coordinate operations of the other network computing devices. The plurality of servers 16(1)-16(n) may operate as a plurality of network computing devices within cluster architecture, a peer-to peer architecture, virtual machines, or within a cloud architecture. In some examples, the server 16(1) and DNS server 16(2) can be a single server or network traffic manager apparatus 14.

Figure 3:
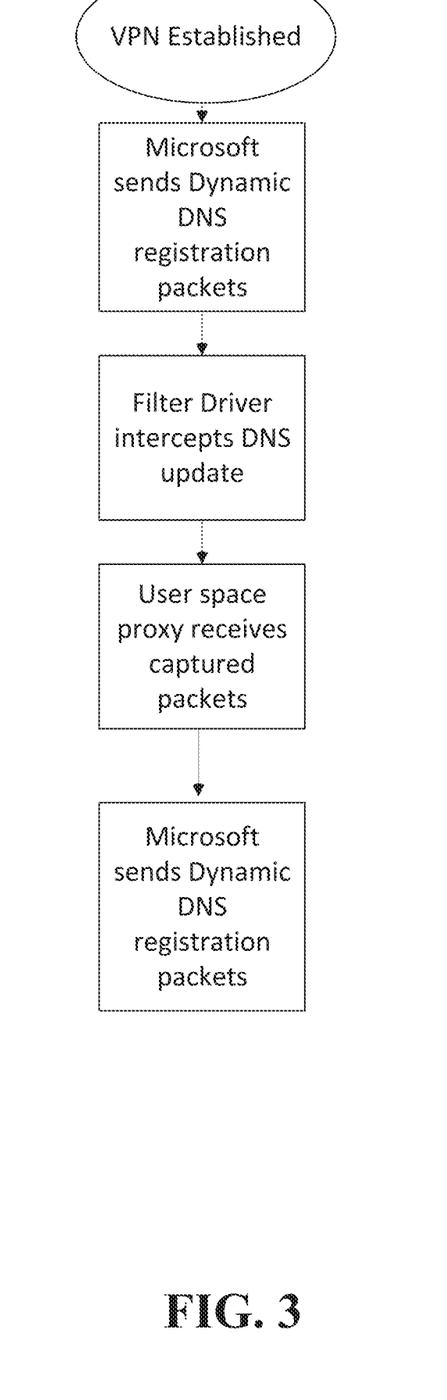
FIG. 3 is a flowchart of an exemplary process of selectively routing packets based on a configuration.
Figure 4:
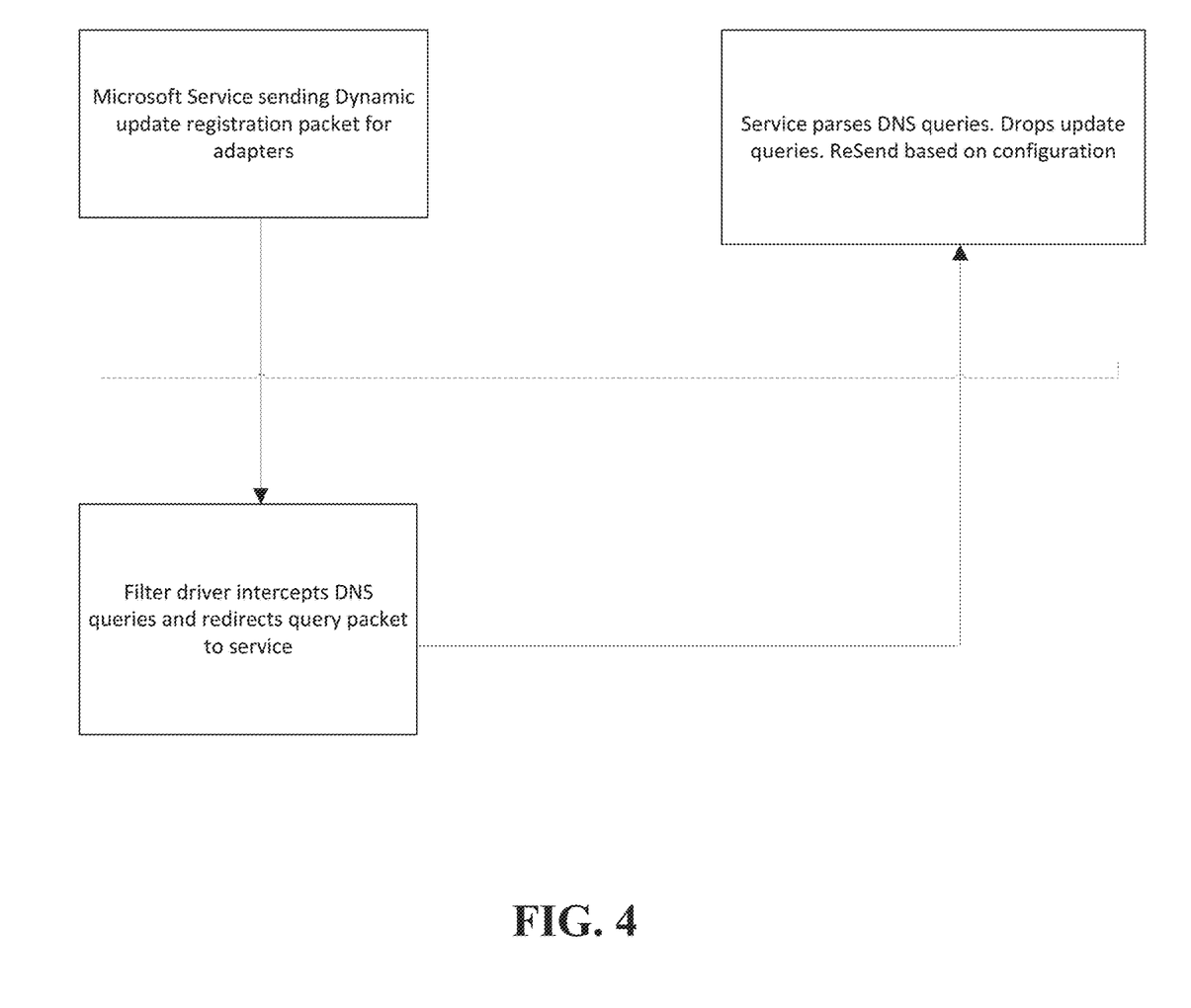
FIG. 4 is a flowchart of an exemplary process of selectively routing a query.
Figure 5:
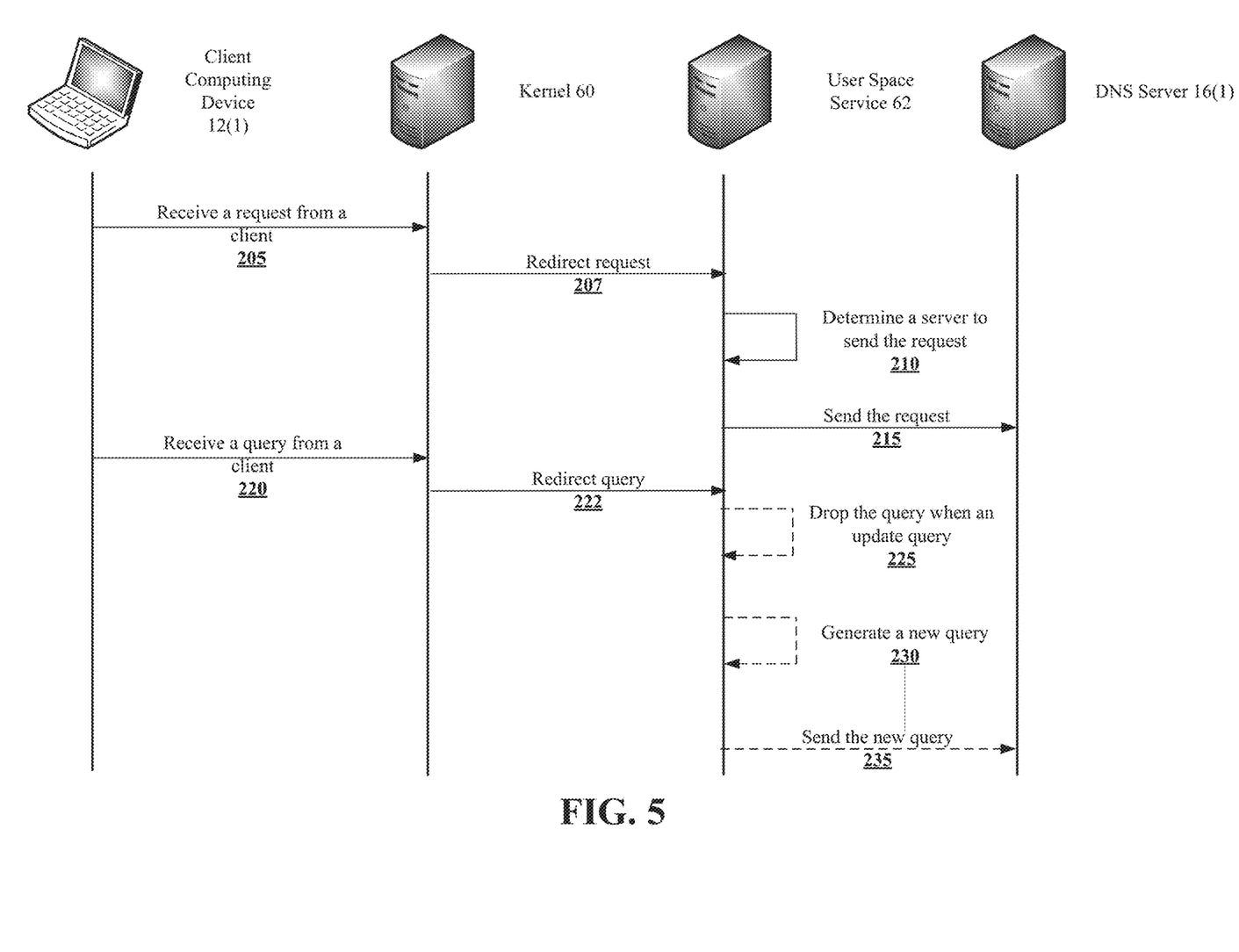
FIG. 5 is an exemplary diagram illustrating a sequence for selectively routing packets by selectively registering an adapter.

The network traffic manager apparatus 14 direct DNS queries and responses between the plurality of client computing devices 12(1)-12(n) and the plurality of servers 16(1)-16(n). As illustrated in FIGS. 2 and 3, the network traffic manager apparatus 14 may provide data or receive data in response to requests directed from the plurality of client computing devices 12(1)-12(n) or one of the plurality of servers 16(1)-16(n). As mentioned above, the plurality of servers 16(1)-16(n) may contain a plurality of servers, such as a DNS resolver, a DNS server 16(1), or a VPN server 16(2). The DNS server 16(1), DNS resolver, or VPN server 16(2) can also include a central processing unit (CPU) or processor, a memory, and a communication system, which are coupled together by a bus or other link, although other numbers and/or types of network devices could be used. The DNS server 16(1), DNS resolver, or VPN server 16(2) may operate as a part of the plurality of network computing devices within cluster architecture of the plurality of servers 16(1)-16(n), a peer-to peer architecture, virtual machines, or within a cloud architecture.

Thus, the technology disclosed herein is not to be construed as being limited to a single environment and other configurations and architectures are also envisaged. For example, the one or more of the plurality of servers 16(1)-16(n) depicted in FIG. 1 can operate within network traffic manager apparatus 14 rather than as a stand-alone server communicating with network traffic manager apparatus 14 via the communication network(s) 30. In this example the plurality of servers 16(1)-16(n) operate within the memory of the network traffic manager apparatus 14.

While the network traffic manager apparatus 14 is illustrated in this example as including a single device, the network traffic manager apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise network traffic manager apparatus 14 in other examples can be standalone devices or integrated with one or more other devices or applications, plurality of servers 16(1)-16(n) or, the network traffic manager apparatus 14, or applications coupled to the communication network(s), for example. Moreover, one or more of the devices of the network traffic manager apparatus 14 in these examples can be in a same or a different communication network 30 including one or more public, private, or cloud networks, for example.

Although an exemplary network traffic management system 10 with the plurality of client computing devices 12(1)-12(n), the network traffic manager apparatus 14, and the plurality of servers 16(1)-16(n), communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described, and illustrated herein, and as will be appreciated by those of ordinary skill in the art.

One or more of the components depicted in the network traffic management system, such as the network traffic manager apparatus 14, the plurality of client computing devices 12(1)-12(n), the plurality of servers 16(1)-16(n), for example, may be configured to operate as virtual instances on the same physical machine. In other words, one or more of network traffic manager apparatus 14, the plurality of client computing devices 12(1)-12(n), or the plurality of servers 16(1)-16(n) illustrated in FIG. 1 may operate on the same physical device rather than as separate devices communicating through a network as depicted in FIG. 1. There may be more or fewer plurality of client computing devices 12(1)-12(n), network traffic manager apparatus 14, or the plurality of servers 16(1)-16(n) than depicted in FIG. 1. The plurality of client computing devices 12(1)-12(n), the plurality of servers 16(1)-16(n) could be implemented as applications on network traffic manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for selectively routing packets will now be described with reference to FIGS. 2-5. In this non-limiting example, the network traffic manager apparatus 14 may assist in establishing a VPN connection by the use of a VPN adapter (i.e., a virtual adapter). A VPN connection, or virtual private network connection can establish a connection between the plurality of client computing devices 12(1)-12(n) and the plurality of servers 16(1)-16(n) to create a point-to-point tunnel that encrypts data, masks internet protocol (IP) addresses, and sidestep website blocks and firewalls. In particular, the network traffic manager apparatus 14 may establish a secure sockets layer virtual private network (SSL VPN) by the use of a VPN adapter (i.e., a virtual adapter). SSL VPN connections enable the plurality of client computing devices 12(1)-12(n) to access an organization's network 10, or the plurality of servers 16(1)-16(n) without the need for specialized software or equipment. Virtual adapters operate like a physical network adapter within an operating system by using a host physical network adapter to initiate and manage network communications. In this non-limiting example, the VPN adapter can manage, operate and be registered as known in the art, as illustrated in "Dynamic Updates in the Domain Name System," Network Working Group, https://datatracker.ietf.org/doc/html/rfc2136. This document incorporated in its entirely herein.

First in step 205, by way of example, the network traffic manager apparatus 14 receives a domain name system request from one of the plurality of client computing devices 12(1)-12(n), although the network traffic manager apparatus 14 can receive other types or numbers of DNS requests (such as a service binding ("SVCB") or HTTPS request) and the request can be sent to other systems or devices. In particular, the domain name system request from the one of the plurality of client computing device 12(1)-12(n) can be a dynamic domain name system request. Dynamic domain name system ("DNS") requests can automatically update DNS records when an IP address changes. Each of the one of the plurality of client computing devices 12(1)-12(n) may have a host name and IP address associated with each of the one of the plurality of client computing devices 12(1)-12(n). A Microsoft stack application may generate the domain name system request with a mapping between the IP address and hostname for each of the plurality of client computing devices 12(1)-12(n) to send to a DNS server 16(1) through the traffic manager apparatus 14, although other stack applications may also generate the domain name system request. When an adapter (e.g., VPN adapters or non-VPN adapters such as point-to-point protocol adapter, an E0 adapters) is connected to one of the plurality of client computing devices 12(1)-12(n), the Microsoft stack application may send the domain name system request to the network traffic manager apparatus 14 to register the adapter against the host name, which can then be mapped to the IP address on the DNS server 16(1). The Microsoft stack application will send the domain name system request to register the adapter to all DNS servers (e.g., network access DNS servers, DNS server configured on VPN server, or local DNS servers.) in communication with the network traffic manager apparatus 14. Registering the adapter to all DNS servers does not allow for selective routing, and so the network traffic manager apparatus 14 intercepts the domain name system request as outlined in detail in steps 210-240 below. In some examples, the network traffic manager apparatus 14 can redirect the domain name system request to a user space service 62 to intercept.

In step 210, the network traffic manager apparatus 14 or the user space service 62 can determine, based on a configuration of the domain name system request, a server to send the domain name system request. The configuration of the domain name system request can comprise a DNS server type and an adapter type. The DNS server type of the configuration can comprise a system DNS server 16(1) or a DNS server configured on a VPN server 16(2). The adapter type can comprise a VPN adapter or a non-VPN adapter. The network traffic manager apparatus 14 or the user space service 62 may use the DNS server type in the configuration and the adapter types in the configuration to determine to which server the adapter should be registered. The network traffic manager apparatus 14 or the user space service 62 may determine based on the configuration of the domain name system request that the determined server 16(3) can be a system domain name system server when the adapter is a non-virtual private network adapter, and the determined server 16(3) is a virtual private network server comprising a domain name system server when the adapter is a virtual private network adapter.

In step 215, the network traffic manager apparatus 14 or the user space service 62 transmits the domain name system request to the determined server 16(3). When the network traffic manager apparatus 14 determines that the domain name system request is attempting to register the adapter to a server that is not the determined server 16(3) in communication with the network traffic manager apparatus 14, the network traffic manager apparatus 14 may drop the domain name system request and effectively intercept domain name system request. By transmitting the domain name system request to the determined server 16(3) and intercepting domain name system requests to other servers 16(1)-16(n), the disclosed invention can then effectively selectively route domain name system requests.

In step 220, the network traffic manager apparatus 14 receives a domain name system query. The domain name system query may be from the plurality of client computing devices 12(1)-12(n). In some examples, the domain name system query may be a request to ask for the IP address associated with a domain name. In some examples, the domain name system query may be an update query to update the domain name server request in the determined server 16(3). The network traffic manager apparatus 14 can send the domain name system query to a service application such as a user space service 62 to parse out update queries. When the domain name system query is not an update query, the network traffic manager apparatus 14 or user space service 62 may act as a pass through and send the domain name system query to the determined server 16(3).

In step 225, when the domain name system query is an update query, the network traffic manager apparatus 14 or the user space service 62 drops the domain name system query. By dropping the name system query, the network traffic manager apparatus 14 or the user space service 62 effectively intercepts the update query from being directed to a DNS server 16(1) that is not the determined server 16(3) for the update query.

In step 230, the network traffic manager apparatus 14 or the user space service 62 generates a new domain name system query based on the configuration of the domain name system request. By generating a new domain name system query, the network traffic manager is able to replace the dropped domain name system query that was initially directed to all available DNS servers and replace it with the new domain name system query that will be directed by the network traffic manager apparatus 14 to the determined server 16(3).

In step 235, the network traffic manager apparatus 14 or the user space service 62 transmits the new domain name system query to the determined server 16(3) and the exemplary process ends at step 240. By transmitting the new domain name system query to the determined server 16(3), the network traffic manager apparatus 14 may effectively, selectively route domain name system queries.

Having thus described the basic concept of the technology, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations, therefore, is not intended to limit the claimed processes to any order except as may be specified in the claims. Accordingly, the technology is limited only by the following claims and equivalents thereto.

What is claimed is:

1. A method for selectively routing packets, the method implemented by one or more network traffic management apparatuses, server devices, or client devices, the method comprising:
   receiving a domain name system request from a client, wherein the domain name system request comprises a configuration for registration of an adapter;
   determining, based on the configuration of the domain name system request, a server to send the domain name system request, wherein the configuration comprises an adapter type and the server is determined at least in part based on the adapter type of the configuration; and
   transmitting the domain name system request to the determined server.

2. The method as set forth in claim 1, further comprising:
   transmitting the domain name system request to a system domain name system server when the adapter is a non-virtual private network adapter, and to a virtual private network server comprising a domain name system server when the adapter is a virtual private network adapter.

3. The method as set forth in claim 1, wherein the server is further determined based at least on the adapter type and a domain name system server type of the configuration of the domain name system request, wherein the adapter type is a virtual private network adapter or a non-virtual private network adapter, and wherein the domain name system server type is a system domain name system server or a virtual private network server comprising a domain name system server.

4. The method as set forth in claim 1, further comprising:
   receiving a domain name system query after receiving the domain name system request;
   determining whether the domain name system query is an update query; and
   in response to determining that the domain name system query is an update query, dropping the domain name system query.

5. The method as set forth in claim 4, further comprising:
   generating a new domain name system query based on the configuration of the domain name system request; and
   transmitting the new domain name system query to the determined server.

6. A non-transitory computer readable medium having stored thereon instructions for filtering content comprising executable code which when executed by processors, causes the processors to:
   receive a domain name system request from a client, wherein the domain name system request comprises a configuration for registration of an adapter;
   determine, based on the configuration of the domain name system request, a server to send the domain name system request, wherein the configuration comprises an adapter type and the server is determined at least in part based on the adapter type of the configuration; and
   transmit the domain name system request to the determined server.

7. The non-transitory computer readable medium as set forth in claim 6, wherein the processors are further configured to be capable of executing the executable code which when executed by the processors, causes the processors to:
   transmit the domain name system request to a system domain name system server when the adapter is a non-virtual private network adapter, and to a virtual private network server comprising a domain name system server when the adapter is a virtual private network adapter.

8. The non-transitory computer readable medium as set forth in claim 6, wherein the server is further determined based at least on the adapter type and a domain name system server type of the configuration of the domain name system request, wherein the adapter type is a virtual private network adapter or a non-virtual private network adapter, and wherein the domain name system server type is a system domain name system server or a virtual private network server comprising a domain name system server.

9. The non-transitory computer readable medium as set forth in claim 6, wherein the processors are further configured to be capable of executing the executable code which when executed by the processors, causes the processors to:
   receive a domain name system query after receiving the domain name system request;
   determine whether the domain name system query is an update query; and
   in response to determining that the domain name system query is an update query, drop the domain name system query.

10. The non-transitory computer readable medium as set forth in claim 9, wherein the processors are further configured to be capable of executing the executable code which when executed by the processors, causes the processors to:
    generate a new domain name system query based on the configuration of the domain name system request; and
    transmit the new domain name system query to the determined server.

11. A network traffic manager apparatus, comprising memory comprising programmed instructions stored in the memory and processors configured to be capable of executing the programmed instructions stored in the memory to:
    receive a domain name system request from a client, wherein the domain name system request comprises a configuration for registration of an adapter;
    determine, based on the configuration of the domain name system request, a server to send the domain name system request, wherein the configuration comprises an adapter type and the server is determined at least in part based on the adapter type of the configuration; and transmit the domain name system request to the determined server.

12. The network traffic manager apparatus as set forth in claim 11, wherein the processors are further configured to be capable of executing the programmed instructions stored in the memory to:

transmit the domain name system request to a system domain name system server when the adapter is a non-virtual private network adapter, and to a virtual private network server comprising a domain name system server when the adapter is a virtual private network adapter.

13. The network traffic manager apparatus as set forth in claim 11, wherein the server is further determined based at least on the adapter type and a domain name system server type of the configuration of the domain name system request, wherein the adapter type is a virtual private network adapter or a non-virtual private network adapter, and wherein the domain name system server type is a system domain name system server or a virtual private network server comprising a domain name system server.

14. The network traffic manager apparatus as set forth in claim 11, wherein the processors are further configured to be capable of executing the programmed instructions stored in the memory to:

receive a domain name system query after receiving the domain name system request;

determine whether the domain name system query is an update query; and in response to determining that the domain name system query is an update query, drop the domain name system query.

15. The network traffic manager apparatus as set forth in claim 14, wherein the processors are further configured to be capable of executing the programmed instructions stored in the memory to:

generate a new domain name system query based on the configuration of the domain name system request; and transmit the new domain name system query to the determined server.

16. A network traffic management system, comprising traffic management apparatuses, server devices, or client devices, the network traffic management system comprising memory comprising programmed instructions stored thereon and processors configured to be capable of executing the stored programmed instructions to:

receive a domain name system request from a client, wherein the domain name system request comprises a configuration for registration of an adapter;

determine, based on the configuration of the domain name system request, a server to send the domain name system request, wherein the configuration comprises an adapter type and the server is determined at least in part based on the adapter type of the configuration; and transmit the domain name system request to the determined server.

17. The network traffic management system as set forth in claim 16, wherein the processors are further configured to be capable of executing the programmed instructions stored in the memory to:

transmit the domain name system request to a system domain name system server when the adapter is a non-virtual private network adapter, and to a virtual private network server comprising a domain name system server when the adapter is a virtual private network adapter.

18. The network traffic management system as set forth in claim 16, wherein the server is further determined based at least on the adapter type and a domain name system server type of the configuration of the domain name system request, wherein the adapter type is a virtual private network adapter or a non-virtual private network adapter, and wherein the domain name system server type is a system domain name system server or a virtual private network server comprising a domain name system server.

19. The network traffic management system as set forth in claim 16, wherein the processors are further configured to be capable of executing the programmed instructions stored in the memory to:

receive a domain name system query after receiving the domain name system request;

determine whether the domain name system query is an update query; and in response to determining that the domain name system query is an update query, drop the domain name system query.

20. The network traffic management system as set forth in claim 19, wherein the one or more processors are further configured to be capable of executing the programmed instructions stored in the memory to:

generate a new domain name system query based on the configuration of the domain name system request; and transmit the new domain name system query to the determined server.

\* \* \* \* \*